No. 755,406. PATENTED MAR. 22, 1904.
F. SPENGLER.
BEARING FOR BALLS ROLLING ON TWO RAILS.
APPLICATION FILED JUNE 26, 1902.
NO MODEL.

WITNESSES:

INVENTOR.
Franz Spengler
BY
ATTORNEYS.

No. 755,406. Patented March 22, 1904.

UNITED STATES PATENT OFFICE.

FRANZ SPENGLER, OF BERLIN, GERMANY.

BEARING FOR BALLS ROLLING ON TWO RAILS.

SPECIFICATION forming part of Letters Patent No. 755,406, dated March 22, 1904.

Application filed June 26, 1902. Serial No. 113,246. (No model.)

*To all whom it may concern:*

Be it known that I, FRANZ SPENGLER, a subject of the King of Prussia, German Emperor, residing at No. 44 Lindenstrasse, Berlin, in the Kingdom of Prussia, German Empire, have invented certain new and useful Improvements in Bearings for Balls Rolling on Two Rails, of which the following is a specification.

This invention relates to a bearing for balls rolling on two rails and intended for use as a substitute for the quickly worn and torn wheels and axles or shafts with carrying-rolls, trucks of traveling cranes, and similar devices employed for the transporting of loads; and the invention consists in combining, with a bearing-body having for the reception of a carrying-ball a suitably large aperture with a groove or grooves for freely rotating small balls, said carrying-ball in such a manner that it projects equally at the two sides of said bearing-body or its aperture, so that the said ball may rest or roll upon the two rails or upon the two parallel parts of a double rail. I prefer to use in the aperture of the bearing-body two grooves with small balls instead of one, because by this means a symmetrical arrangement of the carrying-ball in said aperture may be obtained.

In order to make my invention more clear, I refer to the accompanying drawings, in which similar letters denote similar parts throughout the several views, and in which—

Figure 1:
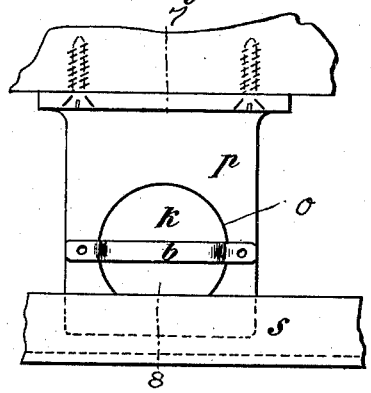
Figure 2:
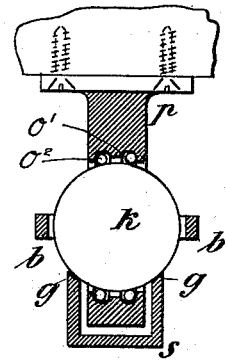
Figure 3:
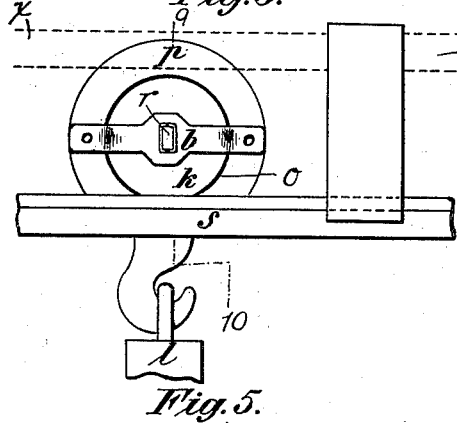
Figure 4:
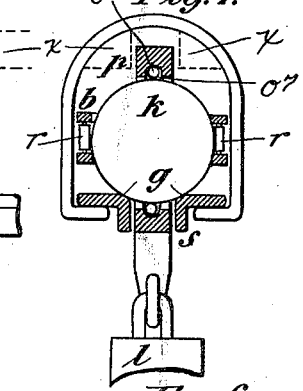
Figure 5:
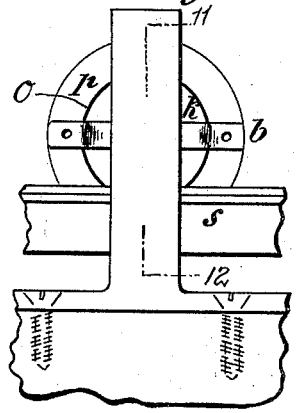

Figure 1 is a side view of a ball-bearing constructed according to my invention. Fig. 2 is a section in line 7 8 of Fig. 1. Fig. 3 is a side view of a slightly-modified form of construction. Fig. 4 is a section in line 9 10 of Fig. 3. Fig. 5 is a side view of another modification, and Fig. 6 is a section in line 11 12 of Fig. 5.

Figure 6:
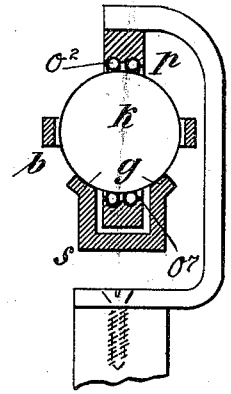

Referring to all the figures, $p$ is the bearing-body, which is provided with a cylindrical aperture or opening $o$, Figs. 1, 3, and 5, the peripheral surface of which has two grooves $o'$, with small balls $o^2$, Figs. 2, 4, and 6. Said aperture contains and said grooves and small balls surround the large carrying-ball $k$, which is held laterally by cheeks $b$ or the like provided, if desired, with a roller or rollers $r$, Figs. 3 and 4. If there are two such grooves $o'$ and rows of small balls $o^2$, the large ball $k$ assumes automatically a central position with regard to the body $p$, so that the cheeks $b$ or rollers $r$ are not subjected to any strain whatever. The ball $k$ rolls upon the surfaces $g$ of the rails or double rail $g$.

The lower part of the body $p$ may be guided by taking between the two parallel parts of the rail or rails $g$; but instead of or besides the rails special guide-pieces may be provided— for instance, such as indicated by dotted lines at $x$ in Figs. 3 and 4. The actual exact guidance of the whole is, however, brought about by the convexity of the large ball $k$, because this latter adjusts itself with respect to the surfaces $g$ of the rails $s$, as do also the small balls $o^2$ with respect to the balls $k$.

Bearings and balls of the combination aforedescribed may be used singly as well as in groups of two or more, just as the case may be.

Having now described my invention, what I desire to secure by a patent of the United States is—

1. In combination in a ball-bearing, a body portion adapted to be connected with the load to be supported, said body portion having a circular opening therein, a ball placed centrally in said opening, small balls between said ball and the top and bottom of said opening, and means arranged laterally at the bottom of said body portion and on each side thereof upon which said ball travels.

2. In combination in a ball-bearing, a ball, a track having two portions, supporting the ball on each side of its vertical diameter, a body portion encircling the ball and having its lower portion extending down between the supporting portions of the track, and small balls between said body portion and the ball.

In witness whereof I have hereunto set my hand in presence of two witnesses.

FRANZ SPENGLER.

Witnesses:
 HENRY HASPER,
 WOLDEMAR HAUPT.